United States Patent [19]

Martin

[11] 3,769,121
[45] Oct. 30, 1973

[54] RETREADING OF TIRES
[75] Inventor: Aubrey Wilfred Martin, Heilbron, South Africa
[73] Assignee: Republic Rubber Industries (Proprietary) Limited, Heilbron, South Africa
[22] Filed: Apr. 26, 1971
[21] Appl. No.: 137,194

[30] Foreign Application Priority Data
Dec. 18, 1970 South Africa...................... 70/8547

[52] U.S. Cl.................... 156/96, 156/394, 156/128, 264/315, 264/326, 425/17, 425/43, 425/39, 425/44
[51] Int. Cl.......................... B29h 5/04, B29h 17/36
[58] Field of Search...................... 156/96, 110, 394, 156/128, 127, 129; 264/315, 326; 425/17, 43, 39, 44

[56] References Cited
UNITED STATES PATENTS
3,325,326   6/1967   Schelkmann.................... 156/394 X
3,236,709   2/1966   Carver................................. 156/96
1,579,641   4/1926   Burdette.............................. 156/96
2,292,286   8/1942   Owen................................... 156/96
2,966,936   1/1961   Shelkmann .......................... 156/96
2,976,910   3/1961   Nowak.................................. 156/96

FOREIGN PATENTS OR APPLICATIONS
746,375   3/1956   Great Britain........................ 156/96

Primary Examiner—Alfred L. Leavitt
Assistant Examiner—C. B. Cosby
Attorney—Karl W. Flocks

[57] ABSTRACT

The invention provides for a method of and means for the retreading of tires. In accordance with the invention a tire is retreaded by enclosing it in a flexible envelope, sealing the envelope, establishing a higher pressure outside the envelope to force the envelope against the new tread and thereby to force the new tread against the tire casing, and raising the ambient temperature outside the envelope.

1 Claim, 3 Drawing Figures

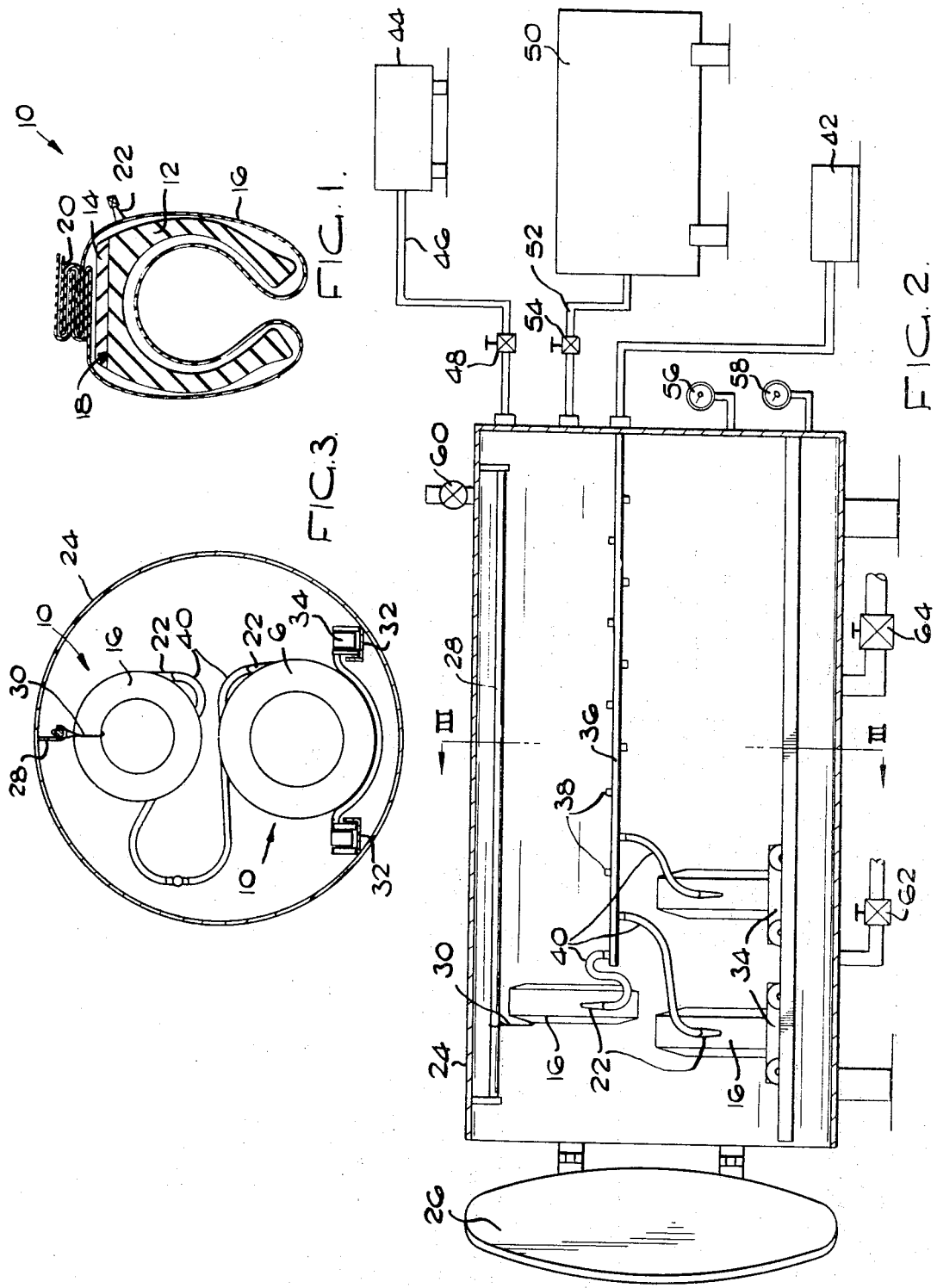

RETREADING OF TIRES

BACKGROUND OF THE INVENTION

THIS INVENTION relates to improvements in or relating to the retreading of tires. The invention relates in particular to an improved method of and apparatus for the retreading of tires.

SUMMARY OF THE INVENTION

According to the invention there is provided a method of retreading tires including locating a tread over the tread zone of a tire casing, enclosing the tread and tread zone in a flexible envelope, establishing a superatmospheric fluid pressure at ambient temperature outside the envelope to force the envelope against the tread and the tread against the casing, and raising the ambient temperature outside the envelope.

Further according to the invention there is provided apparatus for the retreading of tires by enclosing a tire casing and a tread in a flexible envelope, the apparatus including means to establish a super-atmospheric fluid pressure outside the envelope, and means to raise the ambient temperature outside the envelope.

The means to establish a super-atmospheric pressure may be a pressure vessel. The temperature in the pressure vessel may be raised by introducing a heated fluid, such as steam, under pressure into the pressure vessel.

The method may include the further step of applying suction to the space between the flexible envelope and the tire casing and sucking out air from this space.

The super-atmospheric fluid pressure may be in the form of a gas such as air under pressure.

The tread may be in strip form and may be pre-cured. Conveniently, a bonding composition may be provided between the tread and the tire casing. The bonding composition may be a rubber compound adapted to cure at a temperature in the region of 85° C.

The flexible envelope may have a peripheral slit to be positioned along the tread region of the tire casing. The envelope may be fitted over the tread and over the tire casing by interfolding the marginal regions of the envelope a plurality of times within one another.

The invention is now described by way of an example with reference to the accompanying drawings, in which:

FIG. 1 shows a cross-sectional view of a tire casing and a tread enclosed in a flexible envelope;

FIG. 2 shows diagrammatically a longitudinal sectional view of a pressure vessel, tire casings in the pressure vessel and ancillary apparatus; and FIG. 3 shows a section on line III—III of FIG. 2.

Referring to FIG. 1, reference numeral 10 indicates generally a combination comprising a tire casing 12, a tread 14 and a flexible envelope 16. The combination 10 is prepared and assembled as follows.

The tread zone 18 of the tire casing 12 is prepared in the conventional manner for receiving the new tread 14. The new tread 14, pre-cured and in strip form is prepared in the conventional manner for fitting into the tread zone 18. A bonding composition in the form of a rubber compound which will cure at the relatively low temperature of 85° C is applied to the tread zone 18. The new tread 14 is affixed to the compound on the tread zone.

The tire casing 12 with the new tread 14 affixed to it is now enclosed in the flexible envelope 16 which is impervious to fluid flow. The envelope which may be of an elastic material such as rubber, is peripherally slit. It is fitted over the tire casing 12 and new tread 14 by interfolding the marginal regions 20 a plurality of times within one another. A one-way valve 22 is provided in the flexible envelope through which air may be sucked out from the space between the envelope and the tire casing. When air is thus sucked out, the envelope 16 is forced against the tread 14 which is thereby forced against the tire casing 12.

Referring now to FIGS. 2 and 3, there is shown a pressure vessel 24 having a hinged door 26 for providing access into the interior of the vessel. Inside the vessel is provided a hanging rail 28 and hooks 30 for supporting light tires such as passenger vehicle tires. Tracks 32 are provided at the lower region of the vessel for supporting and guiding carriages 34. The carriages 34 are adapted to support heavy tires such as truck and earth moving vehicle tires.

A manifold 36 is provided inside the vessel having branches 38 by means of which it may be connected to the one-way valves in the envelopes 16 through flexible tubes 40. The manifold 36 is connected to a suction pump 42.

A compressor 44 is connected to the pressure vessel 24 via a connection 46 and a valve 48 to establish a super atmospheric air pressure inside the vessel 24. A boiler 50 is connected to the vessel 24 by means of a connection 52 and a valve 54 to introduce steam under pressure into the pressure vessel 24. A pressure gauge 56 and a temperature guage 58 are provided for measuring the pressure and temperature of fluid under pressure in the pressure vessel 24. Reference numeral 60 indicates a pressure relief safety valve and 62 and 64 indicate a steam trap valve and steam blow down and drain valve respectively.

In operation the combination 10 of tire 12 and tread 14 enclosed in envelope 16 is placed in the pressure vessel 24. The flexible connection 40 on the manifold 36 is connected to the valve 22 in the envelope and the door 26 is closed. The suction pump 42 is operated to suck out air from the space between the envelope and the tire casing. Air under pressure is pumped by the compressor 44 into the vessel 24 at ambient temperature until the pressure in the vessel is about 4.2 kg/sq.cm. (60 lbs/sq.inch). Steam is then injected into the pressure vessel from the boiler 50 to heat the compressed air in the vessel to a temperature of about 85° C and the pressure in the vessel is raised to about 6.0 kg/sq.cm. (85 lbs/sq.inch).

The suction on the envelope is maintained for about 30 minutes after vessel 24 is pressurized.

The pressure of 6.0 kg/sq.cm. at a temperature of 85° C is maintained for: 1½ hours for passenger vehicle tires; 2 hours and longer for truck and earth moving vehicle tires.

An advantage of the invention is that by applying fluid (air) pressure first at ambient temperature into a pressure vessel before raising the temperature in the vessel by introducing a heated fluid (steam), the dangers of a premature cure are avoided or at least reduced. Any leaks in the envelope may be detected and rectified before the temperature in the vessel is raised, whereby the defective curing of tires is avoided.

I claim:

1. A method of retreading tires including locating a precured tread of the tread zone of a tire casing with an uncured bonding material interposed between the tread and the tire casing, enclosing the tread and the tread zone in a flexible envelope, rapidly establishing a super-atmospheric fluid pressure at ambient temperature below curing temperature outside the envelope thus avoiding precuring of said bonding material, exhausting air from the space between the envelope and the tire casing by applying suction and forcing the envelope against the tread and the tread against the tire casing, after establishing the super-atmospheric pressure outside the envelope, raising the ambient temperature outside the envelope to the curing temperature of the bonding material by the injection of steam, and maintaining the super-atmospheric pressure and the raised temperature until the bonding material is cured and bonds the tread to the tire casing.

* * * * *